US010163082B1

(12) United States Patent
Unsal et al.

(10) Patent No.: US 10,163,082 B1
(45) Date of Patent: Dec. 25, 2018

(54) GAMIFICATION OF FIELDS IN ONLINE E-COMMERCE DOCUMENTS

(71) Applicants: Cem Unsal, Alameda, CA (US); Per-Kristian G. Halvorsen, Mountain View, CA (US); Todd Elliott, Mountain View, CA (US); Roger Charles Meike, Redwood City, CA (US); Calum G. Murray, Santa Rosa, CA (US); Jason Hardiman, San Francisco, CA (US)

(72) Inventors: Cem Unsal, Alameda, CA (US); Per-Kristian G. Halvorsen, Mountain View, CA (US); Todd Elliott, Mountain View, CA (US); Roger Charles Meike, Redwood City, CA (US); Calum G. Murray, Santa Rosa, CA (US); Jason Hardiman, San Francisco, CA (US)

(73) Assignee: INTUIT INC., Mountain View, CA (US)

( * ) Notice: Subject to any disclaimer, the term of this patent is extended or adjusted under 35 U.S.C. 154(b) by 524 days.

(21) Appl. No.: 14/923,376

(22) Filed: Oct. 26, 2015

(51) Int. Cl.
*G06Q 40/00* (2012.01)
*G06Q 20/10* (2012.01)

(52) U.S. Cl.
CPC .................. *G06Q 20/102* (2013.01)

(58) Field of Classification Search
CPC ....... G06Q 40/00; G06Q 20/10; G06Q 20/102
USPC ......................................................... 705/40
See application file for complete search history.

(56) References Cited

U.S. PATENT DOCUMENTS

| 8,498,915 | B2* | 7/2013 | Eder ..................... | G06Q 40/06 705/35 |
| 2003/0220863 | A1* | 11/2003 | Holm ..................... | G06O 20/04 705/37 |
| 2003/0233278 | A1* | 12/2003 | Marshall ................ | G06Q 30/00 705/14.35 |
| 2008/0120218 | A1* | 5/2008 | Reid ..................... | G06Q 20/10 705/37 |

(Continued)

OTHER PUBLICATIONS

New to Market, Electronic Payments Week: NA. Access Intelligence, LLC. (Mar. 22, 2005).*

*Primary Examiner* — Lalita M Hamilton
(74) *Attorney, Agent, or Firm* — Ferguson Braswell Fraser Kubasta PC

(57) ABSTRACT

A method for collecting a payment. The method includes sending, to a payor, a request for the payment, wherein the request comprises an original payment amount and an original payment due date, generating, based on a set of payment collection records from an online financial management application used by payees, a payment statistical measure representing a payment behavior of payors paying the payees, generating, based on the payment statistical measure, the original payment amount, and the original payment due date, an adjusted payment amount and a condition to qualify the adjusted payment amount for completing the payment, enabling, prior to the payor completing the payment, the payor to view the adjusted payment amount and the condition, wherein the payor completes the payment in response to at least the payor viewing the adjusted payment amount and the condition, and collecting the payment completed by the payor.

20 Claims, 8 Drawing Sheets

(56) References Cited

U.S. PATENT DOCUMENTS

| | | | |
|---|---|---|---|
| 2009/0248572 A1* | 10/2009 | Haggerty | G06Q 40/00 705/38 |
| 2010/0106582 A1* | 4/2010 | Etheredge | G06Q 30/02 705/14.17 |
| 2011/0295722 A1* | 12/2011 | Reisman | G06Q 30/0201 705/27.1 |
| 2013/0060361 A1* | 3/2013 | Gabrail | G07F 17/32 700/91 |
| 2013/0132283 A1* | 5/2013 | Hayhow | G06Q 20/1085 705/67 |
| 2015/0193872 A1* | 7/2015 | Ivanoff | G06Q 20/14 705/38 |
| 2016/0314501 A1* | 10/2016 | Bartholomew | G06Q 30/0275 |
| 2017/0136366 A1* | 5/2017 | Gabrail | A63F 13/828 |
| 2017/0294075 A1* | 10/2017 | Frenkel | G07F 17/3288 |

* cited by examiner

GAMIFICATION OF FIELDS IN ONLINE E-COMMERCE DOCUMENTS

BACKGROUND

Gamification refers to a process of making systems, services and activities enjoyable and motivating for the user in a non-game context. While gamification offers a gameful experience to improve user engagement, gamification is not about creating a game.

Electronic commerce, commonly known as e-commerce or eCommerce, is trading in products or services using computer networks, such as the Internet. Electronic commerce draws on technologies such as mobile commerce, electronic funds transfer, supply chain management, Internet marketing, online transaction processing, electronic data interchange (EDI), inventory management systems, and automated data collection systems. In particular, modern eCommerce typically uses the World Wide Web (www) for at least one part of the transaction's life cycle. In recent years, there has been an explosive growth of eCommerce financial solutions provided by eCommerce financial institutions and third parties to facilitate various stages of settling eCommerce trades.

SUMMARY

In general, in one aspect, the invention relates to a method for collecting a payment. The method includes sending, to a payor, a request for the payment, wherein the request comprises an original payment amount and an original payment due date, generating, based on a plurality of payment collection records from an online financial management application (FMA) used by a plurality of payees, a payment statistical measure representing a payment behavior of a plurality of payors paying the plurality of payees, generating, based on the payment statistical measure, the original payment amount, and the original payment due date, an adjusted payment amount and a condition to qualify the adjusted payment amount for completing the payment, enabling, prior to the payor completing the payment, the payor to view the adjusted payment amount and the condition, wherein the payor completes the payment in response to at least the payor viewing the adjusted payment amount and the condition, and collecting the payment completed by the payor.

In general, in one aspect, the invention relates to a system for collecting a payment. The system includes a financial management application (FMA) used by a plurality of payees, a computer processor, memory storing instructions executable by the computer processor, wherein the instructions comprise a payment statistics analyzer configured to generate, based on a plurality of payment collection records from the FMA, a payment statistical measure representing a payment behavior of a plurality of payors paying the plurality of payees, a payment collection manager configured to send, to a payor, a request for the payment, wherein the request comprises an original payment amount and an original payment due date, and generate, based on the payment statistical measure, the original payment amount of the payment, and the original payment due date of the payment, an adjusted payment amount and a condition to qualify the adjusted payment amount for completing the payment, and enable, prior to the payor completing the payment, the payor to view the adjusted payment amount and the condition, and a repository configured to store the payment statistical measure, the request for the payment, the adjusted payment amount, and the condition, wherein the payor completes the payment in response to at least the payor viewing the adjusted payment amount and the condition.

In general, in one aspect, the invention relates to a non-transitory computer readable medium storing instructions for collecting a payment. The instructions, when executed by a computer processor, include functionality for sending, to a payor, a request for the payment, wherein the request comprises an original payment amount and an original payment due date, generating, based on a plurality of payment collection records from an online financial management application (FMA) used by a plurality of payees, a payment statistical measure representing a payment behavior of a plurality of payors paying the plurality of payees, generating, based on the payment statistical measure, the original payment amount, and the original payment due date, an adjusted payment amount and a condition to qualify the adjusted payment amount for completing the payment, enabling, prior to the payor completing the payment, the payor to view the adjusted payment amount and the condition, wherein the payor completes the payment in response to at least the payor viewing the adjusted payment amount and the condition; and collecting the payment completed by the payor.

Other aspects of the invention will be apparent from the following transaction description and the appended claims.

DETAILED DESCRIPTION

Figure 1:
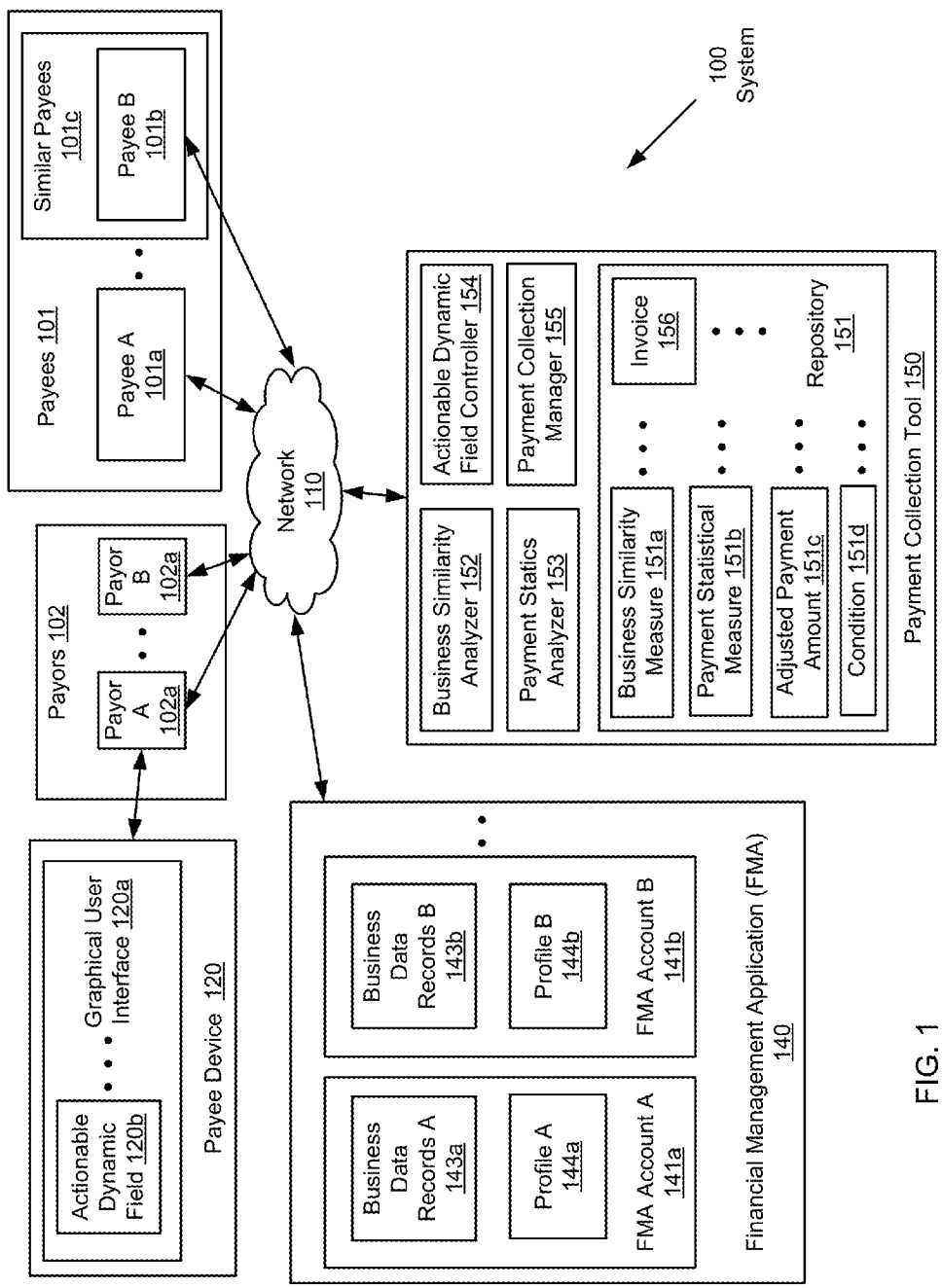
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency. Further, in the figures, a series (two, three, or more) collinear dots mean that more elements of the same type as before the series of collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a method, system, and computer readable medium for generating an online document embedded with an actionable dynamic field to display real time information that changes in response to statistical user activities in a community. The actionable dynamic field may be activated by a viewer of the online document to initiate an action based on the displayed real time information. The initiated action is in turn tallied into the statistical user activities in the community and contributes to a change in the content displayed in another actionable dynamic field embedded in another online document. In one or more embodiments, the online document is an invoice, the user activities correspond to invoice payments, and the statistical user activities are represented by a payment statistical measure. Such embodiments provide a method, system, and computer readable medium for generating the payment statistical measure of payors and payees tracked by an online financial management application (FMA), generating an adjusted payment amount in an invoice for a payor based on the payment statistical measure, and enabling the payor to view the adjusted payment amount and a qualifying condition prior to the payor completing the payment. Accordingly, the payor is motivated to complete the payment expediently.

FIG. 1 shows a block diagram of a system (100) in accordance with one or more embodiments of the invention. Specifically, the system (100) includes payees (101) (e.g., payee A (101a), payee B (101b), etc.), payors (102) (e.g., payor A (102a), payor B (102b), etc.), a payee device (120) used by the payor A (102a), an online financial management application (FMA) (140) used by the payees (101), and a payment collection tool (150) all of which are coupled via a network (110). Further, the payment collection tool (150) includes a business similarity analyzer (152), a payment statistics analyzer (153), an actionable dynamic field controller (154), a payment collection manager (155), and a repository (151) that are coupled to each other.

In particular, the repository (151) is configured to store data used and/or generated by the business similarity analyzer (152), the payment statistics analyzer (153), the actionable dynamic field controller (154), and the payment collection manager (155). In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, each of the payees (101) (e.g., payee A (101a), payee B (101b)) is a business entity engaged in the trade of goods, services, or both to payors (102), such as an individual consumer or business consumer. In particular, an individual consumer is a person or group (e.g., family or other organization) that consumes goods and/or services. A business consumer is a business that consumes goods and/or services. In one or more embodiments of the invention, the business entity may be a sole proprietorship, partnership, company, non-profit organization, etc. For example, the business entity may have a storefront located in at least one physical location. Alternatively or additionally, the business entity may correspond to an Internet business that has an associated website (referred to as an online store). In one or more embodiments, the goods and/or services sold by the business entity correspond to the merchandise sold by the business entity to the payors (102).

Further, as used herein, the business entity is deemed to perform an action when the action is performed on behalf of the business entity. For example, an owner, agent, or officer may act on behalf of the business entity to perform an action. In one or more embodiments, each of the payees (101) (e.g., payee A (101a), payee B (101b)) may include any computing device configured with computing, data storage, and network communication functionalities. For example, the payee A (101a) may use the computing device (not shown) to access the FMA (140) to manage business financial information, such as information related to selling goods and/or services to the payors (102).

Continuing with FIG. 1, in one or more embodiments of the invention, each of the payees (101) (e.g., payee A (101a), payee B (101b)) includes functionality to perform one or more financial transactions with one or more customers. A financial transaction is the exchange of a merchandise item for payment. A financial transaction may be a sale of a merchandise item, a return of a merchandise item, a down payment on a merchandise item, or any other exchange of merchandise that involve finances. In one or more embodiments, the financial transaction is performed over the Internet and is referred to as an eCommerce transaction. Generally, a financial transaction is represented by a transaction record. In one or more embodiments, the transaction record is recorded information regarding the financial transaction. Each transaction record includes a transaction description of the financial transaction. The transaction description describes the financial transaction and may be a concatenation of various components. For example, the transaction description includes information about the business entity, such as a full or abbreviated name of the business entity, a location of the business entity, a store identifier of the business entity, all or part of a web address for the business entity, etc.

The transaction description further includes information about the purchased merchandise, such as a name, description, or other identifier of the merchandise, purchase price, purchase date, payment, discount, tax, etc. In some embodiments, the transaction description is provided by the business entity and may be the same or similar to transaction descriptions of other business entities. For example, the information about the purchased merchandise may include a part number or other identifier of the merchandise that is assigned by a manufacturer or supplier of the merchandise. Because multiple business entities may acquire a particular merchandise from the same manufacturer/supplier for sale to the customers, the same part number or other identifier of the particular merchandise may be repeated in multiple transaction descriptions of multiple business entities among the payees (101). In one or more embodiments, the transaction record of an eCommerce transaction is referred to as an eCommerce document. The information contained in one or more eCommerce documents is referred to as eCommerce data.

In one or more embodiments of the invention, each of the payees (101) (e.g., payee A (101a), payee B (101b)) includes functionality to perform additional financial activities separate from the financial transactions associated with purchase and/or sale of merchandise. For example, the additional financial activities may include payroll payments to employees, contractors, or other human resources of the business entity, tax and/or licensing payments to regulatory agencies/organizations, capital spending with respect to equipment/machineries, short term and/or long term loan payments, etc. The records describing the additional financial activities and the financial transaction records associated with purchase and/or sale of merchandise are collectively referred to as business data records of the business entity. In one or more embodiments, the business data records further include information derived from the records describing the additional financial activities and the financial transaction records associated with purchase and/or sale of merchandise. For example, the derived information may include a number of employees, a revenue amount, a merchandise list, a merchandise price list, a customer list, customer transaction statistics, etc.

Continuing with FIG. 1, in one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet.

In one or more embodiments of the invention, the FMA (140) is a set of software solutions designed to manage financial transactions and other financial activities of the payees (101). In one or more embodiments of the invention, the FMA (140) may be an accounting software, a business tax preparation application, or any other types of business financial management application. In one or more embodiments, the FMA (140) is provided by an application service provider, such as a software as a service (SaaS). For example, the FMA (140) may be operated by the application service provider (ASP) and accessed by the payees (101) on a subscription basis. In one or more embodiments, the payees (101) interact with the FMA (140) to conduct or otherwise manage the aforementioned financial transactions and additional financial activities.

Examples of the interaction with the FMA (140) are listed in TABLE 1 below. In particular, the entry "invoice" in TABLE 1 refers to the payees (101) interacting with the FMA (140) to issue one or more invoices to request payments. An invoice is a document issued by a seller (e.g., a business entity) to a buyer (e.g., a customer), relating to a sale transaction (or trade) and including the merchandise, quantities, and agreed prices for the merchandise provided by the seller to the buyer. Payment terms may be specified on the invoice to indicate that the buyer has a maximum number of days in which to pay and may be offered a discount if paid before the due date. Similarly, other interactions listed in TABLE 1 may also generate other financial documents or eCommerce documents, such as a "bill" for services rendered or merchandise shipped, a "message" regarding an "invoice" or "bill", a request for a "task" (e.g., from accountant to client, asking to send copies of a specific document via email).

In addition, TABLE 2 below shows example types of recorded events (also referred to as activities) as the result of the interaction with the FMA (140). With respect to the entry "invoice" in TABLE 1, TABLE 2 includes example invoice events, such as the invoice may be sent, delivered, viewed, paid, with corresponding payment initiated, updated, accepted, rejected, disputed, with an error, with a note, deleted, reminded, with corresponding payment completed, closed, and/or voided. In one or more embodiments, the aforementioned business data records include records of the interaction with the FMA (140) and the resultant events. In one or more embodiments, the FMA (140) retrieves certain business data records from financial institutions (e.g., bank, credit card service provider, etc.) used by the payees (101). Further, the FMA (140) stores and organizes the financial activity data and retrieved business data records under individual financial accounts of the payees (101). For example, information (i.e., transaction records and other financial activity data) associated with the payee A (101a) is stored as the business data records A (143a) in an individual financial account (i.e., FMA account A (141a)) of the payee A (101a).

Similarly, information (i.e., transaction records and other financial activity data) associated with the payee B (101b) is stored as the business data records B (143b) in an individual financial account (i.e., FMA account B (141b)) of the payee B (101b). In one or more embodiments, the business data records A (143a) includes records of payment collection by the payee A (101a), and the business data records B (143b) includes records of payment collection by the payee B (101b). For example, the records of payment collection (i.e., payment collection records) may correspond to the aforementioned invoice events listed in TABLE 2. In one or more embodiments, the FMA (140) provides the payment collection records to the payment collection tool (150) to facilitate payment collection. For example, the invoice (156) may be generated by the FMA (140) and provided to the payment collection tool (150). Further, the invoice (156) may be issued using the FMA (140) by the payee A (101a) to the payor A (102a).

TABLE 1

BILL
BILL_CREDIT
BILL_PAYMENT
BILL_PAYMENT_CHECK
BILL_PAYMENT_CREDIT_CARD
BUILD_ASSEMBLY
CHECK
CREDIT_CARD_CHARGE
CREDIT_CARD_CREDIT
CREDIT_CARD_REFUND
CREDIT_MEMO
DEPOSIT
DOCUMENT
ESTIMATE
FOLDER
GENERAL_JOURNAL_ENTRY
INVITE,
INVENTORY_ADJUSTMENT
INVOICE ***
ITEM_RECEIPTS
LIABILITY_ADJUSTMENT
LIABILITY_ADJUSTMENT_CARRY_OVER
LIABILITY_ADJUSTMENT_PRIOR_PMT
LIABILITY_ADJUSTMENT_REFUND_CHECK
MESSAGE ***
PAYCHECK
PAYMENT ***
PAYROLL_LIABILITY_CHECK
PURCHASE_ORDER
SALES_ORDER
SALES_RECEIPT
SALES_TAX_PAYMENT
STATEMENT_CHARGE
TASK
TRANSFER
YTD_ADJUSTMENT

TABLE 2

SENT /** Document was created and sent to recipient, e.g. invoice was initially created and sent to customer */
DELIVERED /** Document was marked as having arrived at the target destination */
VIEWED /** Recipient viewed a document, e.g. customer received and viewed the invoice */
PAID /** Invoice or similar document was paid (unfortunately only applicable to some domain types) */
PAYMENT_INITIATED /** Payment was initiated for invoice or similar document, but may yet be completed */
UPDATED /** Document that was already sent has been updated and resent */
ACCEPTED /** Document has been received and accepted, e.g. in the case of invoice this implies an agreement to pay */
REJECTED /** Document has been received and rejected, e.g. in the case of invoice this indicates the receiver will not pay */
DISPUTED /** Document has been received and is in dispute, e.g. a dialog over charges is ongoing */
ERROR /** Some kind of error occurred in processing the document, e.g. validation error or delivery error, details may be specified in the activity note */

TABLE 2-continued

NOTE /** Caller is providing some info in the activity note field */
DELETED /** Document was deleted from domain service */
REMINDED /** Reminder related to the document was sent */
COMPLETED /** Document was marked completed (e.g. task recipient indicated task is finished) */
CLOSED /** Document was marked closed (e.g. accountant confirmed that task is really finished) */
VOIDED /** Document (e.g. invoice) was voided in system of record */

Continuing with FIG. 1, in one or more embodiments of the invention, in addition to the business data records A (143a) of the payee A (101a), the FMA account A (141a) further includes a profile A (144a). Similarly, in addition to the business data records B (143b) of the payee B (101b), the FMA account B (141b) further includes a profile B (144b). In one or more embodiments, each of the profile A (144a) and the profile B (144b) includes one or more of a industry category, a business location/address, a store name, a store location, a number of stores, a number of employees, etc. of the respective business entity.

As noted above, the payment collection tool (150) includes the business similarity analyzer (152), the payment statistics analyzer (153), the actionable dynamic field controller (154), the payment collection manager (155), and the repository (151). In one or more embodiments, the repository (151) may include a disk drive storage device, a semiconductor storage device, a database management system, other suitable computer data storage device, or combinations thereof. In one or more embodiments, content stored in the repository (151) may be a data file, a linked list, a data sequence, a database, a graphical representation, or any other suitable data structure. In one or more embodiments of the invention, the repository (151) includes functionality to store data for the payment collection tool (150). The data stored in the repository (151) includes invoices (e.g., invoice (156)), business similarity measures (e.g., business similarity measure (151a)), payment statistical measures (e.g., payment statistical measure (151b)), payment adjustments (e.g., payment adjustments (151c)), and conditions (e.g., condition (151d)) that are generated and/or used by the business similarity analyzer (152), the payment statistics analyzer (153), the actionable dynamic field controller (154), and the payment collection manager (155). Each of these components is described below.

Continuing with FIG. 1, in one or more embodiments of the invention, the business similarity analyzer (152) is configured to obtain the business entities" business data records and profile information from the FMA (140) for comparison to identify similar business entities. In one or more embodiments, the business similarity analyzer (152) retrieves or otherwise obtains the information of the payee A (101a) (referred to as the subject business entity or the subject payee) and other business entities (referred to as target business entities in the context of comparison) from the FMA (140) for comparison. In particular, the subject business entity is a business entity using a gamification feature (described below) provided by the actionable dynamic field controller (154) to improve payment collection. Specifically, the retrieved information includes the business data records A (143a) of the payee A (101a), the profile A (144a) of the payee A (101a), the business data records B (143b) of the payee B (101b), the profile B (144b) of the payee B (101b), etc.

Continuing with FIG. 1, in one or more embodiments, the retrieved information of the payee A (101a) is compared to the retrieved information of each target business entity to generate a similarity measure for each target business entity. For example, the business data records A (143a) and the profile A (144a) are compared to the business data records B (143b) and the profile B (144b) to generate the business similarity measure (151a). Specifically, the business similarity measure (151a) represents a level of similarity between the payee A (101a) and the payee B (101b). For example, the level of similarity may correspond to similarity in one or more of the industry category, business location/address, store name, store location, the number of stores, the number of employees, revenue amount, merchandise list, merchandise price list, customer list, customer transaction statistics, etc. of the payee A (101a) and the target business entity, such as the payee B (101b). The business similarity measure (151a) may be a numeric score, a letter score, a percentage, etc. In one or more embodiments, the payee B (101b) is considered as a similar business entity to the payee A (101a) if the business similarity measure (151a) meets a pre-determined criterion. For example, the business similarity measure (151a) may be compared to a minimum threshold to qualify the payee B (101b) as a similar business entity to the payee A (101a). In one or more embodiments, multiple business entities may be qualified as being similar to the payee A (101a) and are collectively referred to as the similar payees (101c).

In one or more embodiments of the invention, the business similarity measure (151a) may be generated further based on information retrieved from a personal financial management application (not shown) regarding the customers of the payee A (101a) and the customers of the payee B (101b). For example, the personal financial management application is a set of software solutions designed to manage financial transactions and other financial needs of the customers. Specifically, the personal financial management application may be a personal financial software, a personal tax preparation application, or any other types of personal financial management application. In one or more embodiments, the personal financial management application and the FMA (140) are provided by the same application service provider. In one or more embodiments, the business similarity analyzer (152) identifies the customers of the payee A (101a) and the payee B (101b) based on customer lists and/or transaction records contained in the business data records A (143a) and the business data records B (143b). Once the customers of the payee A (101a) and the payee B (101b) are identified, the information associated with the customers may be retrieved from the personal financial management application for comparison. Accordingly, the similarity between customer information of the payee A (101a) and the payee B (101b) is determined and included as part of the business similarity measure (151a).

In one or more embodiments of the invention, the payment statistics analyzer (153) is configured to generate, based on the payment collection records provided by the FMA (140), payment statistical measures that represent statistics of the payors (102) paying the payees (101). The statistics may correspond to a duration between invoice issuance to payment completion. As noted above, the invoice (156) is issued by the payee A (101a) using the FMA (140) to the payor A (102a). In one or more embodiments, to facilitate payment collection by the payee A (101a) for the invoice (156), the payment statistics analyzer (153) generates the payment statistical measure (151b) based on the payment collection records associated with the similar payees (101c) that are found to be similar to the payee A (101a). In one or more embodiments, the payment statistics analyzer (153) uses the method described in reference to FIG. 2A to generate the payment statistical measure (151*b*) that is used by the actionable dynamic field controller (154) to deliver gamification features for facilitating payment collection by the payee A (101*a*). An example of the payment statistical measure is described in reference to FIG. 3A below.

Continuing with FIG. 1, in one or more embodiments of the invention, the payment collection manager (155) is configured to send a request for the payment to a payor, such as the payor A (102*a*). In one or more embodiments, the request for the payment is based on an invoice (e.g., the invoice (156)) that specifies an original payment amount (e.g., $100 or any other monetary amount) and an original payment due date (e.g., Sep. 3, 2015 or any other calendar date). The original payment amount is a monetary value that is owed by the payor to the payee as specified by the invoice. The original payment due date is the date when the payment becomes delinquent if not paid in full. Accordingly, the request for the payment may include or reiterate the original payment amount and the original payment due date. As noted above, the invoice (156) is generated by the FMA (140) and provided to the payment collection tool (150) for facilitating payment collection by the payee A (101*a*).

In one or more embodiments, the payment collection manager (155) is further configured to generate an adjusted payment amount (151*c*) and a condition (151*d*) to qualify the adjusted payment amount (151*c*) for completing the payment. The adjusted payment amount (151*c*) is an alternative monetary value that substitutes the monetary value of the original payment amount for completing the payment. In particular, if the condition (151*d*) is met, the payee A (101*a*) agrees to accept the adjusted payment amount (151*c*) from the payor A (102*a*) and the payment is deemed as completed. In one or more embodiments, the condition (151*d*) specifies the alternative monetary value of the adjusted payment amount (151*c*) as a function of time, such as a current time, a length of time till the original due date, or other time point relative to the original due date. In one or more embodiments, the adjusted payment amount (151*c*) is used as an incentive reward to encourage the payor A (102*a*) to complete the payment in an advantageous manner to the payee A (101*a*). For example, the incentive reward may include a discount to motivate the payor A (102*a*) to submit the payment expediently. Accordingly, the condition (151*d*) specifies a level of payment expediency (e.g., within certain number of days prior to the due date) as a qualifying condition for the payor A (102*a*) to receive the incentive reward.

In one or more embodiments, the payment collection manager (155) generates the adjusted payment amount (151*c*) and the condition (151*d*) as a conditional discount for motivating the payor A (102*a*) to complete the payment expediently. In one or more embodiments, the adjusted payment amount (151*c*) and the condition (151*d*) are generated based on the payment statistical measure (151*b*), the original payment amount of the payment, and the original payment due date of the payment. Accordingly, the payment collection manager (155) enables, prior to the payor A (102*a*) completing the payment, the payor A (102*a*) to view the adjusted payment amount (151*c*) and the condition (151*d*).

Figure 2A:
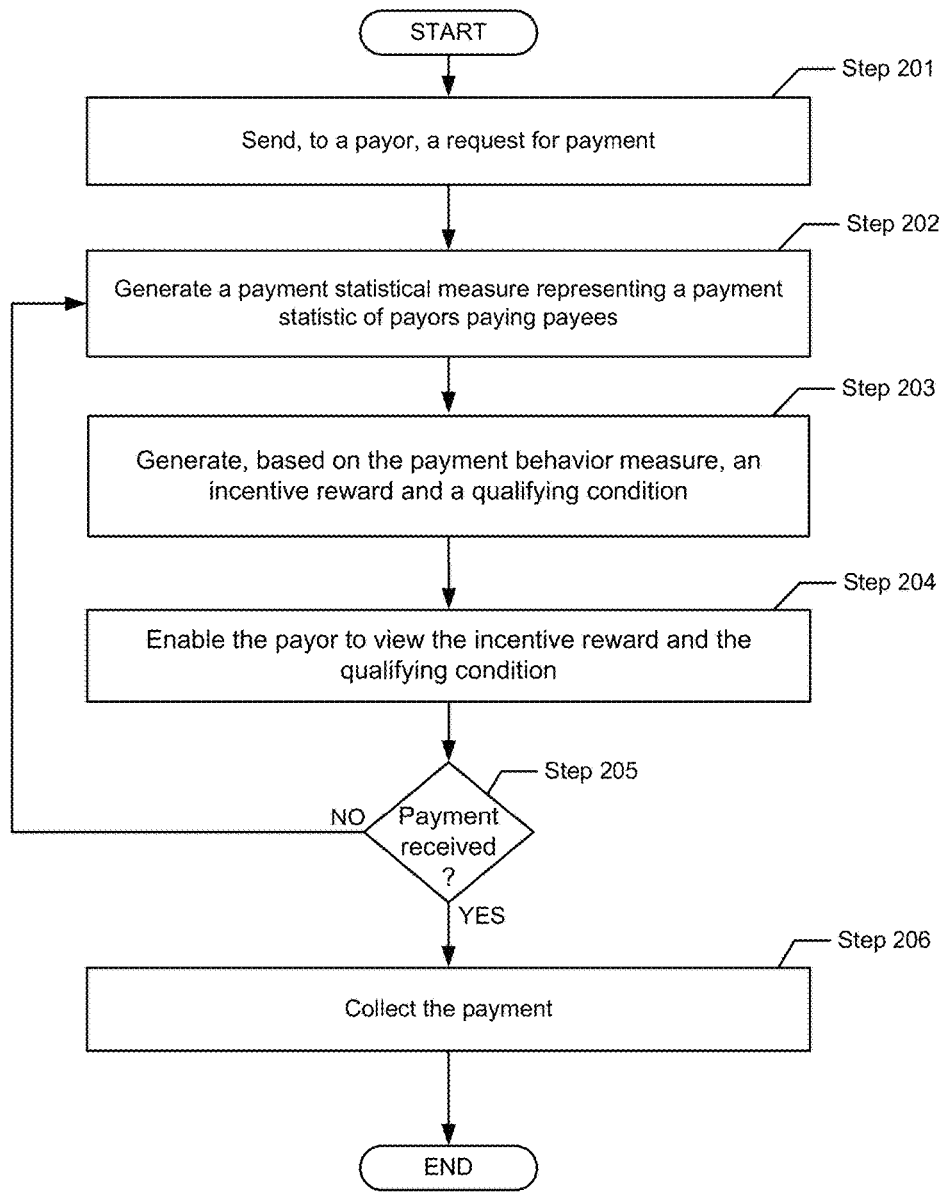
FIG. 2A and FIG. 2B show method flowcharts in accordance with one or more embodiments of the invention.

In one or more embodiments, the payment collection manager (155) uses the method described in reference to FIG. 2A to generate conditional discounts that are used by the actionable dynamic field controller (154) to deliver gamification features for facilitating payment collection by the payee A (101*a*). Examples of the conditional discounts are described in reference to FIGS. 3B and 3C below.

Continuing with FIG. 1, in one or more embodiments of the invention, the actionable dynamic field controller (154) is configured to deliver the gamification features by inserting an actionable dynamic field (120*b*) in a graphical user interface (GUI) (120*a*) of the FMA (140). In one or more embodiments, the GUI (120*a*) is presented to the payor A (102*a*) using the payee device (120), which may be any computing or communication device such as a mobile phone, a notebook computer, a laptop or desktop computer, etc. The GUI (120*a*) is a type of user interface that allows the user to interact with electronic devices by manipulating graphical icons and visual indicators. In particular, the actionable dynamic field (120*b*) is one of the graphical icons and visual indicators of the GUI (120*a*). In contrast to common graphical icons and visual indicators, such as a data entry field or a command button, the actionable dynamic field (120*b*) displays a real time animation sequence of dynamic (i.e., changing over time) values until being activated by the user. As used herein, a dynamic value refers to the aforementioned alternative monetary value that is changing over time. Upon activation, the actionable dynamic field (120*b*) initiates a series of pre-determined actions of the FMA (140). In one or more embodiments of the invention, the actionable dynamic field controller (154) is further configured to deliver the gamification features by inserting an actionable dynamic field (120*b*) in other types of GUI, e.g., for viewing an online document such as an email with an embedded or attached copy of the invoice.

In one or more embodiments, the actionable dynamic field controller (154) uses the method described in reference to FIG. 2A to control the actionable dynamic field (120*b*) and deliver gamification features for facilitating payment collection by the payee A (101*a*). Examples of the actionable dynamic field and gamification features for facilitating payment collection are described in reference to FIGS. 3B, 3D, and 3E below.

In one or more embodiments, the payment collection tool (150) is integrated within the FMA (140). In one or more embodiments, the payment collection tool (150) is operated by a service provider that is also the service provider providing the FMA (140) to the payees (101).

Figure 2B:
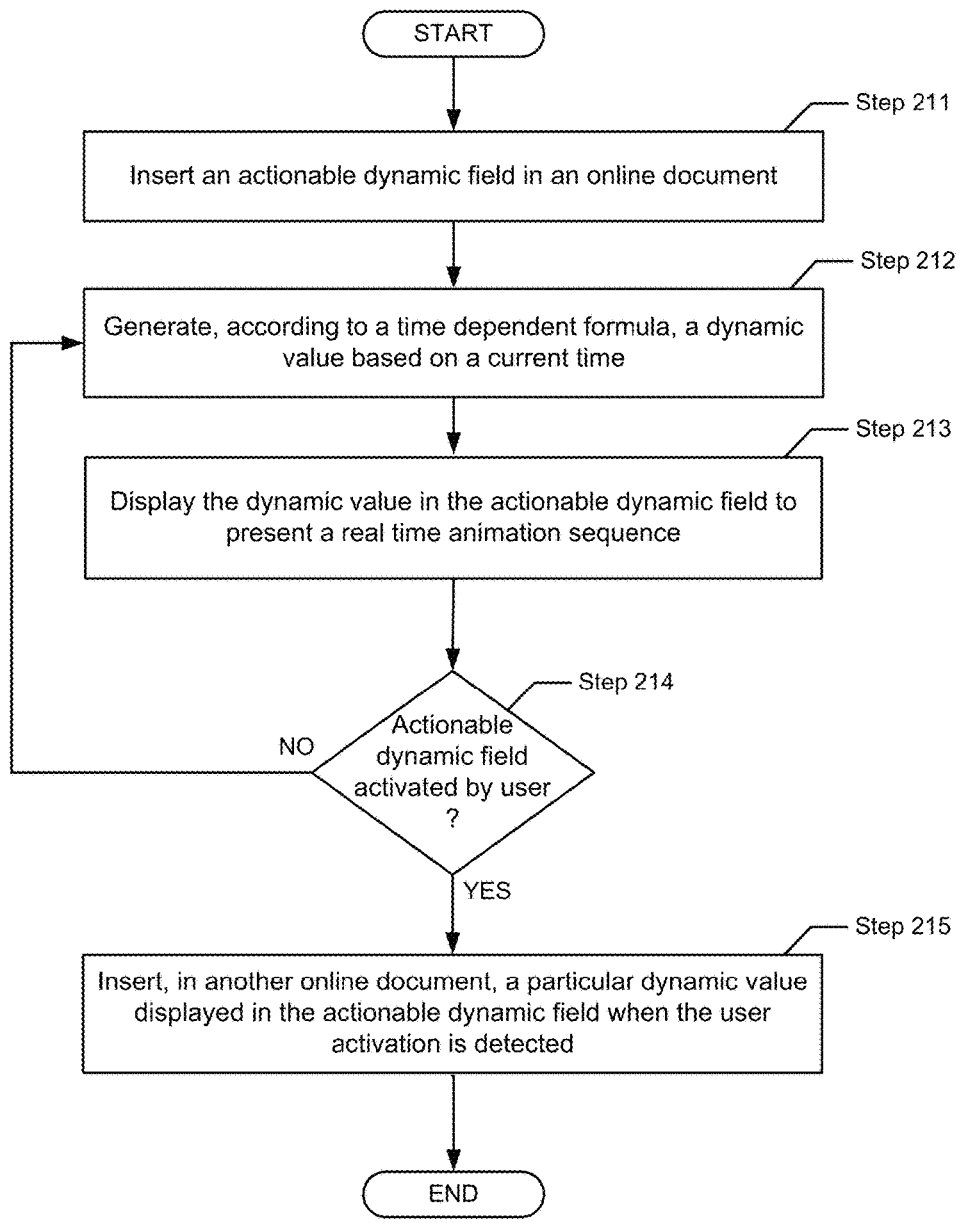

FIGS. 2A and 2B show method flowcharts in accordance with one or more embodiments of the invention. In one or more embodiments of the invention, the methods of FIGS. 2A and 2B may be practiced using the system (100) described in reference to FIG. 1 above. In one or more embodiments of the invention, one or more of the steps shown in FIGS. 2A and 2B may be omitted, repeated, and/or performed in a different order than that shown in FIGS. 2A and 2B. Accordingly, the specific arrangement of steps shown in FIGS. 2A and 2B should not be construed as limiting the scope of the invention.

FIG. 2A shows a flowchart for collecting a payment for a payee (referred to as a subject payee). Initially, in Step 201, a request is sent to a payor (referred to as a subject payor) for collecting the payment. In one or more embodiments of the invention, the request is an invoice or a payment reminder. In particular, the request includes an original payment amount and an original payment due date.

In Step 202, a payment statistical measure is generated that represents a payment statistic of payors paying payees. In one or more embodiments, the payment statistical measure is generated based on a statistical correlation found in the payment collection records from an online financial management application (FMA) used by the payees. For example, the payment collection records associated with similar payees to the subject payee and/or similar payors to the subject payor may be analyzed to generate the statistical correlation. In one or more embodiments, each of the payment collection records corresponds to one of a number of eCommerce transactions between the payors and the payees. As described in reference to TABLE 2 above, a payment collection record may represent an eCommerce action exchanged between a payor and a payee for an eCommerce transaction. For example, invoices, messages associated with the invoices, and completed payments for the invoices may be obtained from the FMA and analyzed to generate the statistical correlation.

In one or more embodiments, the payment collection records are analyzed to extract a payor attribute of the payors, a payee attribute of the payees, and a transaction attribute of the eCommerce actions. As noted above, the payee attribute may include one or more of an industry category, a business location/address, a store name, a store location, a number of stores, a number of employees, or other characteristics of a business entity. In addition, the payor attribute may include one or more of a payor category (e.g., individual or business), a payor address, or other demographic information of the payor. The transaction attribute may include the invoice issue date, invoice amount, payment due date, payment completion date, partial payment status, overdue payment status, etc.

In one or more embodiments, a payment promptness measure is generated based on the extracted transaction attributes. For example, the payment promptness measure may be a statistical measure of the duration between invoice issue date and the payment completion date that is computed for each of the payment collection records. In another example, the payment promptness measure may represent another aspect of statistical distributions of one or more transaction attributes across the payment collection records.

In one or more embodiments, a statistical correlation is generated between the payment promptness measure with respect to a payor attribute, a payee attribute, and/or a transaction attribute. Accordingly, the payment statistical measure is based on the statistical correlation. An example of the payment statistical measure is described in reference to FIG. 3A below.

In Step 203 of FIG. 2A, an incentive reward and a qualifying condition are generated based on the payment statistical measure. In one or more embodiments, the incentive reward includes an adjusted payment amount that is discounted/reduced from the original payment amount. In exchange to the discount, the qualifying condition requires the payment to be submitted or otherwise completed prior to a historical collection time period.

In one or more embodiments, a business target of the subject payee is identified in the online FMA. The business target specifies a target business measure (e.g., cash reserve, liquid asset, etc.) to be met prior to a target date (e.g., an accounting period cut of date). Accordingly, an estimated contribution of the payment to the business target is determined by at least comparing the target business measure and the original payment amount. For example, the estimated contribution may be based on a ratio between the original payment amount and a shortage amount in the target business measure to meet the business target. In one or more embodiments, generating the adjusted payment amount and the condition is further based on the estimated contribution. For example, the adjusted payment amount and the condition are generated for any outstanding invoice/payment with a significant estimated contribution, such as greater than 1%. Specifically, the condition requires that the adjusted payment amount to be received prior to at least the target date such that collecting the adjusted payment amount contributes to meeting the target business measure by the target date.

In one or more embodiments, a payment statistic ranking of the subject payor with respect to other similar payors is generated based on the payment collection records. For example, the payment statistic ranking may identify the subject payor as the second fastest payors in a particular geographical region. In other words, the average number of days for the subject payor to complete payments (e.g., to payees similar to the subject payee) ranks the second place compared to other payors in the particular geographical region. In one or more embodiments, a suggested payment action for the payor to advance to an improved payment statistic ranking is determined based on the payment collection records. For example, the suggested payment action may suggest the payor to submit payments a certain number of days earlier than historical payment practice to improve the payment statistic ranking, such as from the second place to the first place. Accordingly, the qualifying condition is based on the suggested payment action.

In Step 204, prior to the payor completing the payment, the payor is enabled to view the adjusted payment amount and the condition. In one or more embodiments, the adjusted payment amount and the condition are displayed or otherwise presented to the payor using the actionable dynamic field embedded in the invoice or payment reminder. For example, the adjusted payment amount and the condition may be displayed or otherwise presented to the payor using the method described in reference to FIG. 2B below.

In Step 205, a determination is made as to whether the payment is received in response to enabling the payor to view the adjusted payment amount and the condition. If the determination is negative, i.e., the payment has not been received, the method returns to Step 202 for a next iteration. In one or more embodiments, the pending status of this not-yet-received payment is incorporated to update the payment statistical measure before the method proceeds further to Step 203 in the next iteration.

In one or more embodiments, the iteration loop of Steps 202 through 205 are performed concurrently for multiple payment requests from multiple payors to multiple payees. In such embodiments, the payment statistical measure is generated in real time to reflect up to date statistics contributed from these multiple payment requests. For example, when many payors submit payments in response to viewing the offered incentive rewards, the shortage amount in the target business measure to meet the business target may quickly reduce in real time to change the incentive reward for any payor that has not yet completed the payment.

In another example, when many payors submit payments in response to viewing the offered incentive rewards, the payment statistic ranking of any payor that has not yet completed the payment may change quickly resulting in a corresponding change in the qualifying condition for the respective incentive reward. In other words, executing the iteration loop of Steps 202 through 205 for multiple payment requests concurrently results in dynamic changes of the incentive rewards and qualifying conditions. In one or more embodiments, the dynamic changes of the incentive rewards and qualifying conditions are presented to the payors using the actionable dynamic field embedded to provide the gamification features in payment collection.

If the determination in Step 205 is positive, i.e., the payment has been received, the method proceeds to Step 206 where the payment is collected and the corresponding invoiced is closed out.

FIG. 2B shows a flowchart for using an actionable dynamic field in an online document. In one or more embodiments, multiple actionable dynamic fields are used concurrently in multiple online documents. Further, the content displayed in each actionable dynamic field is dependent on a statistical measure of actions applied to and initiated from the multiple actionable dynamic fields. Accordingly, the multiple actionable dynamic fields collectively provide a gamification feature to viewers of the multiple online documents. The gamification feature in turn improves a collective result of the actions applied to and initiated from the multiple actionable dynamic fields. In one or more embodiments of the invention, the online documents include eCommerce documents, such as an invoices, payment reminders, etc. Further, the actions include activities to complete payments specified in the eCommerce documents.

Initially in Step 211, an actionable dynamic field is inserted in an online document. In one or more embodiments of the invention, the online document is an invoice or payment reminder that is displayed in a graphical user interface of an online financial management application (FMA).

In Step 212, a dynamic value is generated based on a current time according to a time dependent formula. In one or more embodiments, the dynamic value is an adjusted payment amount that is discounted from an original payment amount of an invoice or payment reminder. For example, the time dependent formula reduces the discount as the current time progresses to encourage the payor to submit the payment earlier. In particular, the time dependent formula corresponds to the aforementioned qualifying condition for the adjusted payment amount.

In Step 213, the dynamic value is displayed in the actionable dynamic field to present a real time animation sequence. In one or more embodiments, the real time animation sequence presents the adjusted payment amount as a function of the current time according to the time dependent formula.

In Step 214, a determination is made as to whether, at a particular current time, a user activation of the actionable dynamic field is detected. In particular, the dynamic value equals a particular adjusted payment amount at the particular current time. If the determination is negative, i.e., no user activation of the actionable dynamic field is detected at the particular current time, the method returns to Step 212 to update the dynamic value. If the determination is positive, i.e., a user activation of the actionable dynamic field is detected at the particular current time, the method exits the iteration loop of Steps 212 through 214 and proceeds to Step 215. By exiting the iteration loop, in response to detecting the user activation, the dynamic value is prevented from being further iteratively displayed beyond the particular adjusted payment amount.

In Step 215, the particular dynamic value, as displayed in the actionable dynamic field when the user activation is detected, is inserted in another online document. In one or more embodiments, the particular adjusted payment amount, as displayed in the actionable dynamic field when the user activation is detected, is inserted in a payment document used by the payor to complete the payment.

FIGS. 3A, 3B, 3C, 3D, and 3E each show an example in accordance with one or more embodiments of the invention. The example may be practiced based on the system (100) and the method flow chart depicted in FIG. 1 and FIG. 2A, respectively. Specifically, FIGS. 3A, 3B, 3C, 3D, and 3E illustrate a method to analyze eCommerce data to generate statistical measures of payment behaviors, which are used in formulating a conditional reward to motivate a payor to complete a payment expediently. In particular, the method enables a user to present the conditional reward to the payor using a gamification feature. For example, the conditional reward may be displayed in an actionable dynamic field of an invoice, a payment reminder email, or other payment request.

Figure 3A:
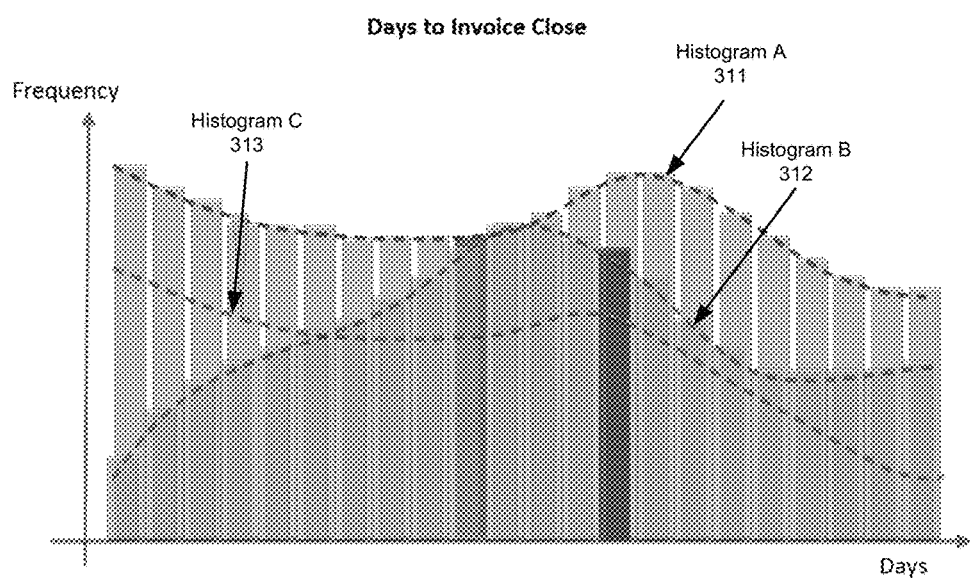
FIGS. 3A, 3B, 3C, 3D, and 3E each show an example in accordance with one or more embodiments of the invention.

FIG. 3A shows an example of statistical measures of payment behaviors of multiple payors (e.g., customers) based on eCommerce data collected from XYZ financial management application. In particular, FIG. 3A shows three histograms of payment collection time period where the horizontal axis corresponds to number of days to close out an invoice and the vertical axis corresponds to a tally of closed invoices. As shown in FIG. 3A, the histogram A (311) represents the number of invoices collected and closed each day by a user "ABC Merchant" (e.g., the aforementioned subject business entity as the payee) versus the number of days during which each invoice has been outstanding. In particular the histogram A (311) shows a local maximum at 15 days. Similarly, the histogram B (312) represents the number of invoices collected and closed each day by other users (e.g., the aforementioned similar business entities based on business location) in the same postal zip code as ABC Merchant versus the number of days during which each invoice has been outstanding. In particular, the histogram B (312) shows a local maximum at 11 days.

In addition, the histogram C (313) represents the number of invoices collected and closed each day by other users (e.g., the aforementioned similar business entities based on business category) in the same industry category as ABC Merchant versus the number of days during which each invoice has been outstanding. In particular, the histogram C (313) shows a local maximum at 13 days. According to the histograms, there is a 2-day lag between the maxima for ABC Merchant to catch up with the other users in the same industry category. The observed payment statistical measure of the 2-day lag is presented by the XYZ financial management application to ABC Merchant with a message "Your business is ranked 47 out of 1230 small businesses in your area when we consider mean time for incoming invoice payments. You can get your invoices paid faster by turning on the gamification feature of your XYZ financial management application." The observed payment statistical measure of the 2-day lag may vary from time to time, for example as the payment behaviors fluctuate seasonally. Accordingly, the content of the message may also vary. If ABC Merchant enables the gamification feature, the XYZ financial management application uses a payment collection tool to generate a dynamic content based on the observed payment statistical measure (e.g., the 2-day lag). The dynamic content is inserted into outgoing invoices or payment reminders to customers of ABC Merchant. In particular, an actionable dynamic field "top-10-widget" is inserted into the outgoing invoice and used to display the dynamic content. The dynamic content includes various reward offers to motivate the customers to pay invoices earlier.

Figure 3B:
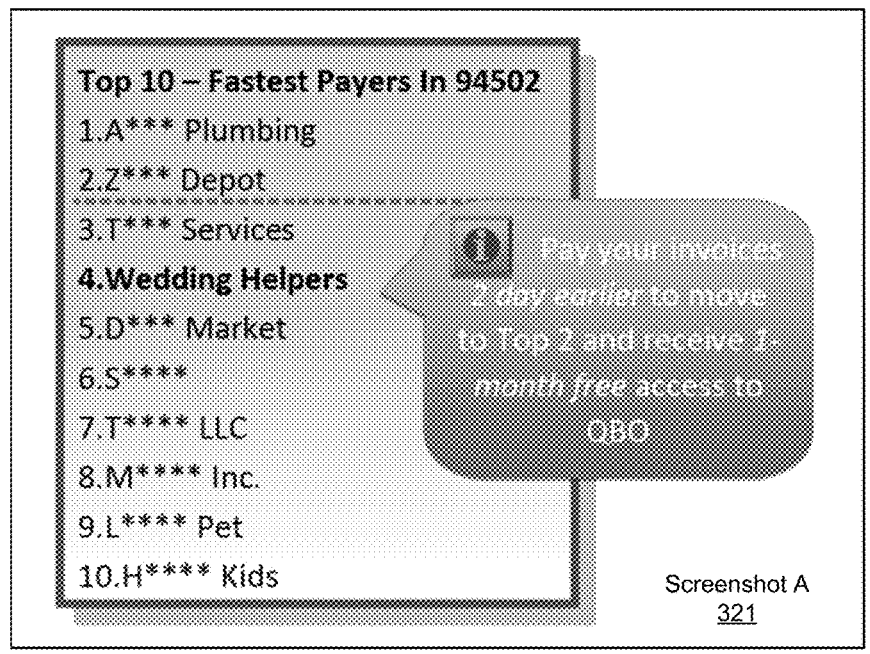

FIG. 3B shows an example screenshot A (321) of the dynamic content displayed by the actionable dynamic field "top-10-widget." In particular, the top-10-widget may be inserted in an outgoing invoice from ABC Merchant to the customer Wedding Helpers. Specifically, Wedding Helper has been determined to rank the fourth place among payors in the postal zip code 94502 area based on the eCommerce data. As shown in FIG. 3B, the dynamic content includes the ranking of top 10 fastest payers and a gamification message suggesting that Wedding Helper may possibility improve the ranking to the second place if the invoices are paid two days earlier than the due dates. In addition to the title of top 20 fastest payers, other titles may also be used, such as "most invoices paid in one month," "most invoices paid today," "small businesses with fastest returns," etc.

As the observed payment statistical measure of the 2-day lag varies from time, the dynamic message displayed by the actionable dynamic field may be adjusted accordingly in real time. In particular, the dynamic content quoting the title "most invoices paid today" is likely changing on a daily basis. In other words, for a single invoice or payment reminder received once by Wedding Helper, the actionable dynamic field may show different dynamic content depending on when the invoice or payment reminder is viewed. If the same invoice or payment reminder is viewed more than once, multiple different dynamic contents may be shown to Wedding Helper. If the same invoice or payment reminder is viewed continuously, the dynamic content shown to Wedding Helper may change in real time reflecting the changing payment behaviors of other small businesses similar to Wedding Helper. For privacy reason, business names of other payors cited in the top 10 ranking are abbreviated. Alternatively, some payor (e.g., users/customers/clients) may 'opt in' and have his/her name displayed in full for advertisement purposes.

Figure 3C:
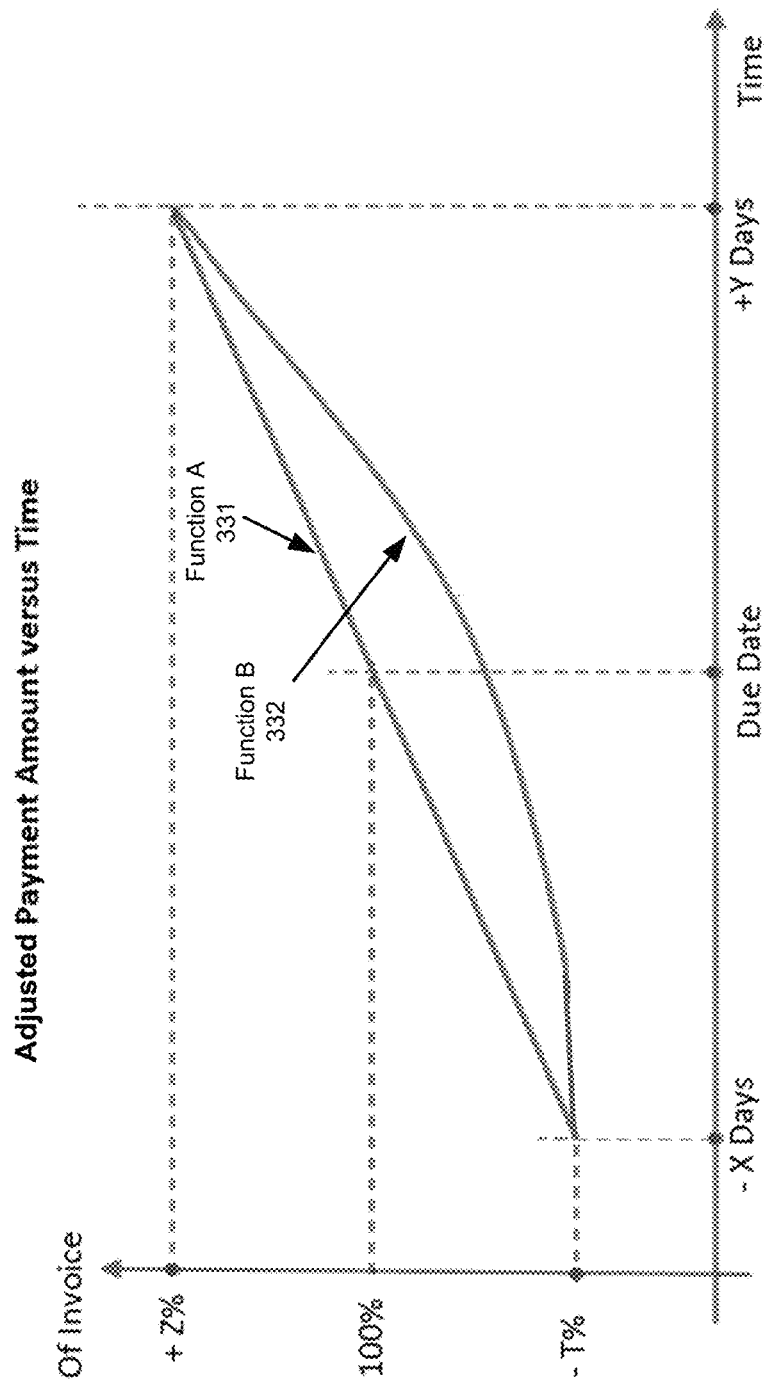

FIG. 3C shows an alternative conditional reward based on the eCommerce data. Specifically, FIG. 3C shows a plot of adjusted payment amount as a function of a timer period surrounding the due date of the payment. Two alternative functions are shown, namely function A (331) and function B (332) having different curvatures. For example, the function A (331) and function B (332) may be used by an actionable dynamic field "payment-adjustment-widget" to compute the adjusted payment amount with T % discount off the original payment amount if the invoice is paid X days before the due date. Further, the function A (331) and function B (332) may be used by the payment-adjustment-widget to compute the adjusted payment amount with Z % surcharge as late penalty over the original payment amount if the invoice is paid Y days after the due date. Based on the different curvatures, the function A (331) or function B (332) may be used by the payment-adjustment-widget to compute various adjusted payment amounts at any time point from X days before the due date to Y days after the due date.

Figure 3D:
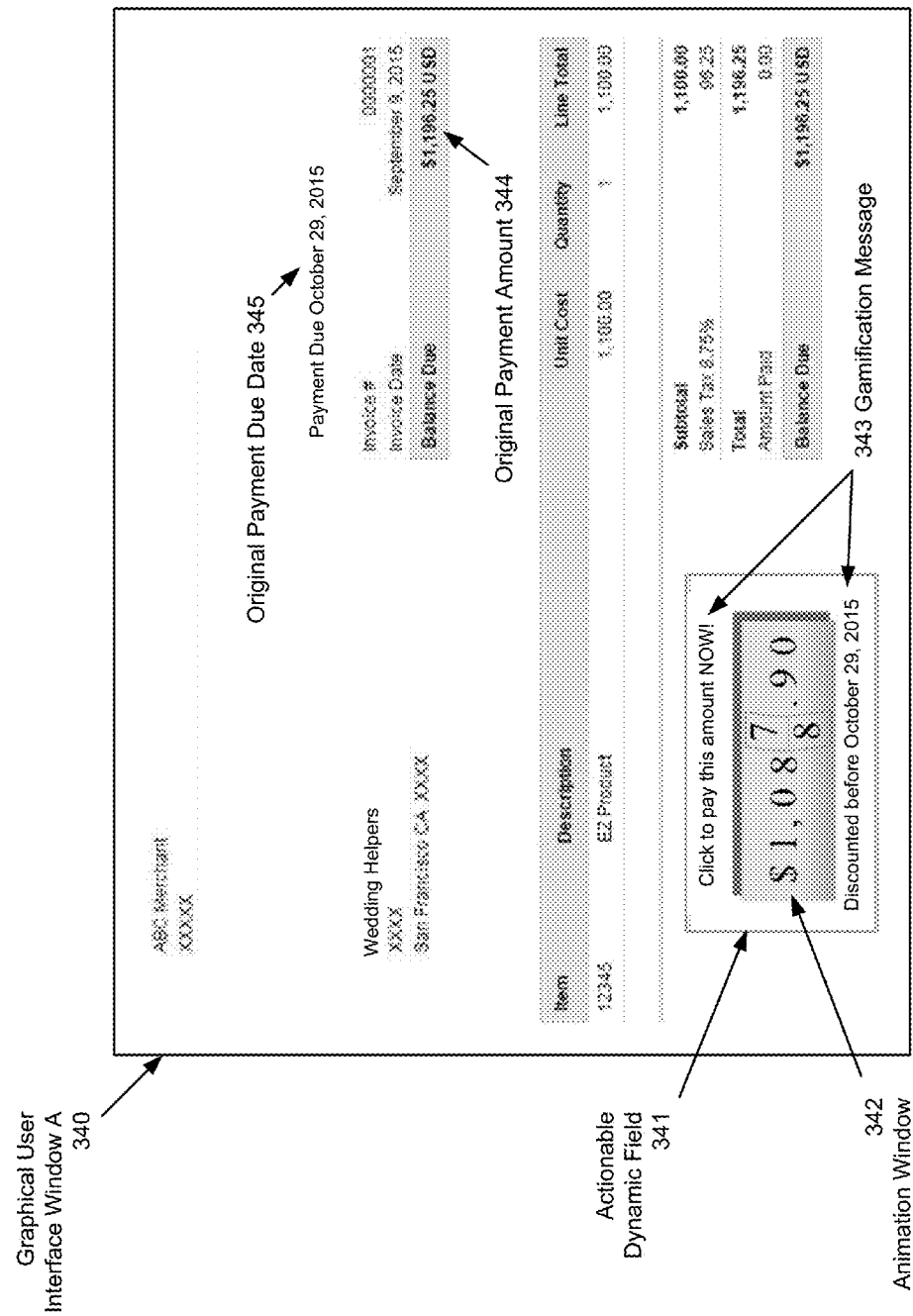

FIG. 3D shows a graphical user interface window A (340) of the XYZ financial application. Specifically, the graphical user interface window A (340) is viewed by Wedding Helpers and shows an invoice received from ABC Merchant. In particular, the invoice shows the original payment amount (344) as $1,196.25 and the original payment due date (345) as Oct. 29, 2015. In addition, the actionable dynamic field (341) is inserted in the invoice or otherwise presented in the graphical user interface window A (340) and overlaying the invoice. In the example shown in FIG. 3D, the actionable dynamic field (341) is the aforementioned payment-adjustment-widget. The dynamic content displayed by the actionable dynamic field (341) includes an animation window (342) and a gamification message (343). The gamification message (343) invites Wedding Helpers to click or activate the actionable dynamic field (341) to initiate a payment procedure in exchange for a discount. The discount is time dependent as reflected in the adjustment payment amount shown in the animation window (342).

For example, the adjustment payment may be computed in real time by the payment-adjustment-widget using the function A (331) shown in FIG. 3C above. As the time progresses, the numerical digits shown in the animation window (342) rolls over to represent the changing adjustment payment amount. Once Wedding Helpers or other authorized viewer of the graphical user interface window A (340) clicks or otherwise activates the actionable dynamic field (341), the rolling digits halt to indicate that the currently displayed adjusted payment amount is locked. In response, Wedding Helpers or other authorized viewer is re-directed to the graphical user interface window B (350) shown in FIG. 3E to initiate and complete the payment procedure. The graphical user interface window A (340) and graphical user interface window B (350) may be shown together on the payor device of Wedding Helpers.

Figure 3E:
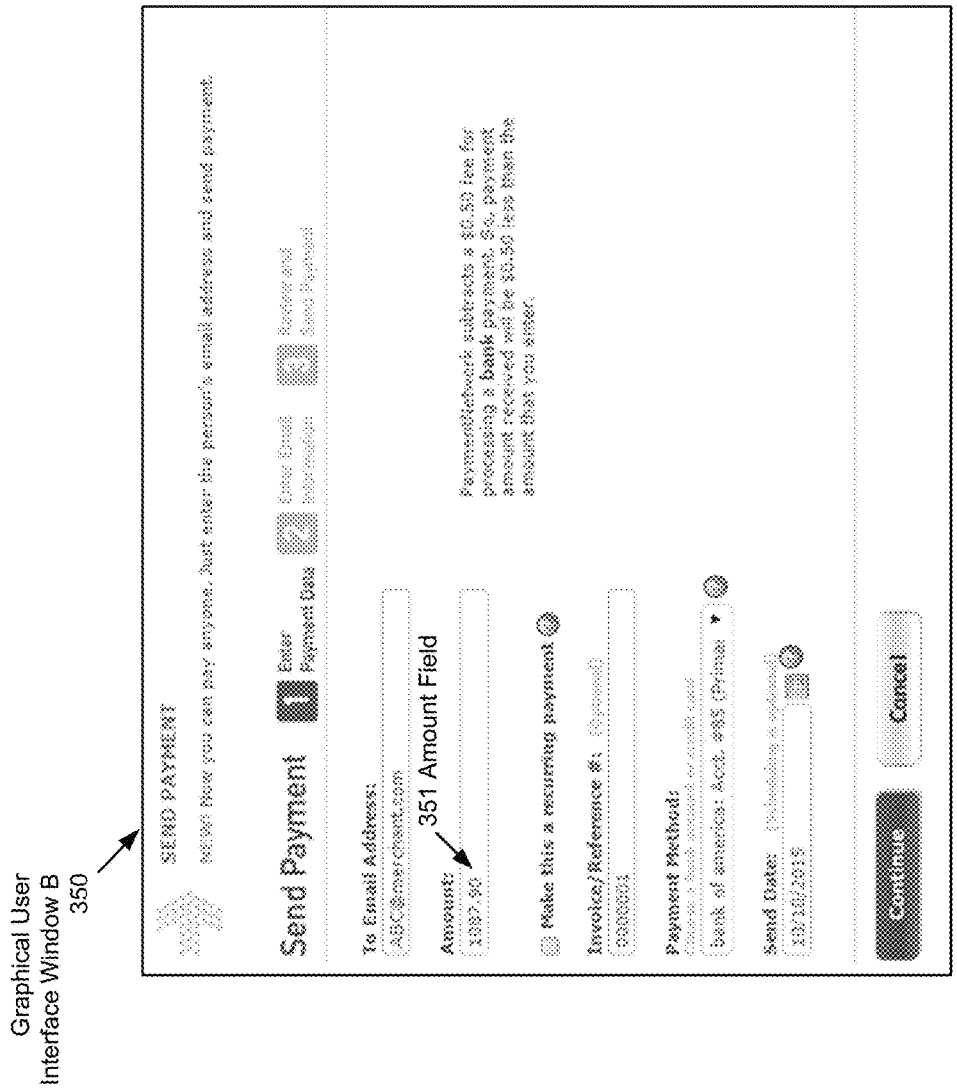

FIG. 3E shows the graphical user interface window B (350) for completing the payment. As shown in FIG. 3E, the displayed adjusted payment amount $1087.90, as locked upon activation of the actionable dynamic field (341), is automatically inserted in the amount field (351). Once required information is entered and verified, Wedding Helpers may continue to complete the payment with the locked discount.

Although FIG. 3C and FIG. 3D are based on the payment-adjustment-widget, the actionable dynamic field (341) shown in FIG. 3C may also be based on the top-10-widget described in reference to FIG. 3B above.

Figure 4:
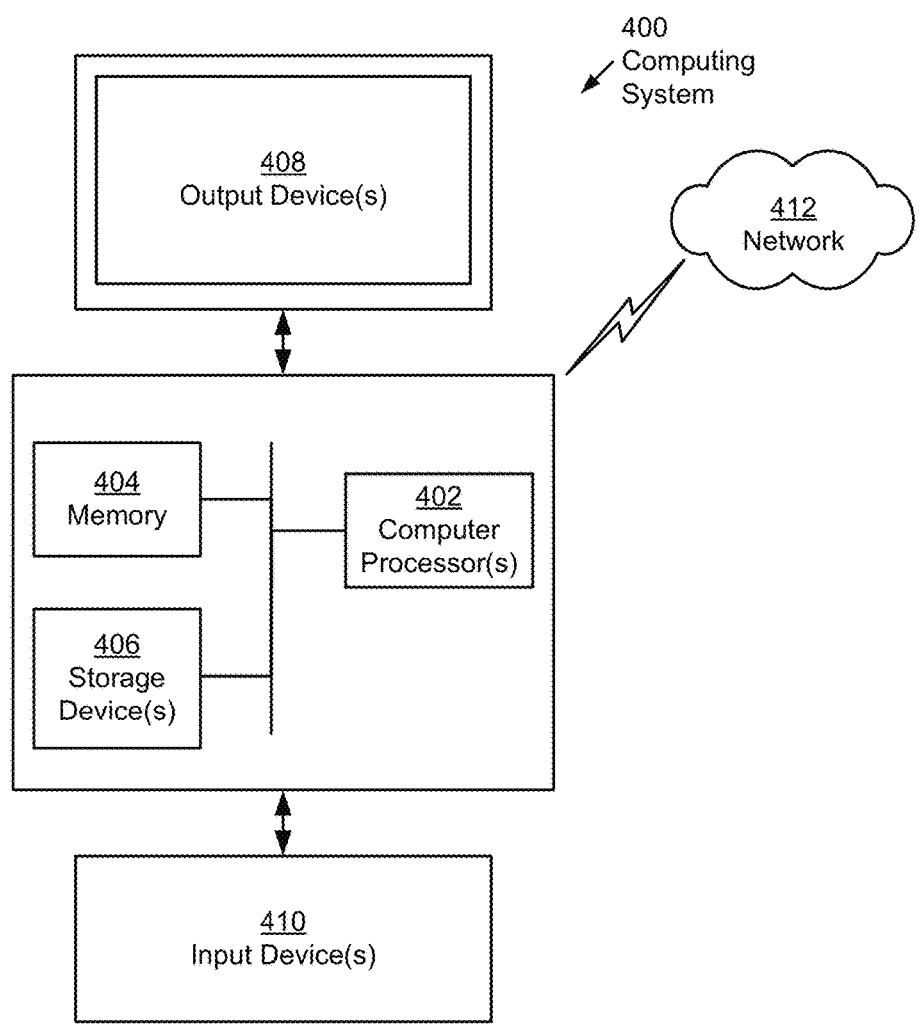
FIG. 4 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for expediating collection of a payment, comprising:
   sending, to a payor, a request for the payment, wherein the request comprises an original payment amount and an original payment due date;
   generating, based on a plurality of payment collection records from an online financial management application (FMA) used by a plurality of payees, a payment statistical measure representing a payment behavior of a plurality of payors paying the plurality of payees;
   generating, based on the payment statistical measure, the original payment amount, and the original payment due date, an adjusted payment amount and a condition to qualify the adjusted payment amount for completing the payment;
   inserting an actionable dynamic field in a graphical user interface of the FMA;
   iteratively generating, according to the condition, a dynamic value of the adjusted payment amount based on a current time;
   detecting, at a particular current time, a user activation of the actionable dynamic field when the dynamic value equals a particular adjusted payment amount;
   enabling, prior to the payor completing the payment, the payor to view the adjusted payment amount and the condition, wherein the payor completes the payment in response to at least the payor viewing the adjusted payment amount and the condition; and
   collecting the payment completed by the payor.

2. The method of claim 1, further comprising:
   generating, based on the payment statistical measure, a payment statistic ranking of the payor with respect to the plurality of payors;
   determining a suggested payment action for the payor to advance to an improved payment statistic ranking with respect to the plurality of payors; and
   enabling, prior to the payor completing the payment, the payor to view the suggested payment action and the improved payment statistic ranking,
   wherein the condition comprises the suggested payment action and the improved payment statistic ranking.

3. The method of claim 1, further comprising:
   identifying, in the online FMA, a business target of a payee of the payment, wherein the business target specifies a target business measure to be met prior to a target date; and
   generating an estimated contribution of the payment to the business target by at least comparing the target business measure and the original payment amount,
   wherein generating the adjusted payment amount and the condition is further based on the estimated contribution, and
   wherein the condition requires that the adjusted payment amount to be received prior to at least the target date.

4. The method of claim 1, further comprising:
   detecting, subsequent to the payor viewing the adjusted payment amount and the condition, that the payor has not submitted the adjusted payment amount based on the condition;
   generating, in response to the detecting, a further adjusted payment amount and a further condition to qualify the further adjusted payment amount for completing the payment;
   enabling, prior to the payor completing the payment, the payor to view the further adjusted payment amount and the further condition; and
   receiving, from the payor and in response to the payor viewing the further adjusted payment amount and the further condition, the further adjusted payment amount to complete the payment based on the further condition.

5. The method of claim 1, further comprising:
   iteratively displaying, as the current time progresses, the dynamic value in the actionable dynamic field to present a real time animation sequence to the payor, wherein the real time animation sequence comprises the adjusted payment amount as a function of the current time according to the condition;
   preventing, in response to detecting the user activation, the dynamic value from being further iteratively displayed beyond the particular adjusted payment amount; and
   inserting, in response to detecting the user activation, the particular adjusted payment amount in a payment document used by the payor to complete the payment.

6. The method of claim 1,
   wherein each of the plurality of payment collection records corresponds one of a plurality of eCommerce transactions between the plurality of payors and the plurality of payees,
   wherein at least one of the plurality of payment collection records represents a plurality of eCommerce actions exchanged for at least one of the plurality of eCommerce transactions, and
   wherein the plurality of eCommerce actions comprises an invoice, a message associated with the invoice, and a completed payment for the invoice that are exchanged between at least one of the plurality of payors and at least one of the plurality of payees.

7. The method of claim 6, wherein analyzing the plurality of payment collection records comprises:

extracting, from the plurality of payment collection records, at least one attribute selected from a group consisting of a payor attribute of the plurality of payors, a payee attribute of the plurality of payees, and a transaction attribute of the plurality of eCommerce actions; and generating a correlation between a payment promptness measure of the plurality of payment collection records with respect to the at least one attribute, wherein the payment statistical measure is based on the correlation.

8. A system for expediting collection of a payment, comprising:

a financial management application (FMA) used by a plurality of payees;

a computer processor;

memory storing instructions executable by the computer processor, wherein the instructions comprise:

a payment statistics analyzer configured to:
generate, based on a plurality of payment collection records from the FMA, a payment statistical measure representing a payment behavior of a plurality of payors paying the plurality of payees, a payment collection manager configured to:
send, to a payor, a request for the payment, wherein the request comprises an original payment amount and an original payment due date,
generate, based on the payment statistical measure, the original payment amount of the payment, and the original payment due date of the payment, an adjusted payment amount and a condition to qualify the adjusted payment amount for completing the payment,
insert an actionable dynamic field in a graphical user interface of the FMA,
iteratively generate, according to the condition, a dynamic value of the adjusted payment amount based on a current time,
detect, at a particular current time, a user activation of the actionable dynamic field when the dynamic value equals a particular adjusted payment amount, and
enable, prior to the payor completing the payment, the payor to view the adjusted payment amount and the condition; and a repository configured to store the payment statistical measure, the request for the payment, the adjusted payment amount, and the condition, wherein the payor completes the payment in response to at least the payor viewing the adjusted payment amount and the condition.

9. The system of claim 8,
wherein the payment statistics analyzer is further configured to:
generate, based on the payment statistical measure, a payment statistic ranking of the payor with respect to the plurality of payors, and
determine a suggested payment action for the payor to advance to an improved payment statistic ranking with respect to the plurality of payors, wherein the payment collection manager is further configured to:
enable, prior to the payor completing the payment, the payor to view the suggested payment action and the improved payment statistic ranking, and
wherein the condition comprises the suggested payment action and the improved payment statistic ranking.

10. The system of claim 8, wherein the payment statistics analyzer is further configured to:
identify, in the online FMA, a business target of a payee of the payment, wherein the business target specifies a target business measure to be met prior to a target date; and
generate an estimated contribution of the payment to the business target by at least comparing the target business measure and the original payment amount,
wherein generating the adjusted payment amount and the condition is further based on the estimated contribution, and
wherein the condition requires that the adjusted payment amount to be received prior to at least the target date.

11. The system of claim 8, wherein the payment collection manager is further configured to:
detect, subsequent to the payor viewing the adjusted payment amount and the condition, that the payor has not submitted the adjusted payment amount based on the condition;
generate, in response to the detecting, a further adjusted payment amount and a further condition to qualify the further adjusted payment amount for completing the payment;
enable, prior to the payor completing the payment, the payor to view the further adjusted payment amount and the further condition; and
receive, from the payor and in response to the payor viewing the further adjusted payment amount and the further condition, the further adjusted payment amount to complete the payment based on the further condition.

12. The system of claim 8, further comprising an actionable dynamic field controller coupled to the payment collection manager and configured to:
iteratively display, as the current time progresses, the dynamic value in the actionable dynamic field to present a real time animation sequence to the payor, wherein the real time animation sequence comprises the adjusted payment amount as a function of the current time according to the condition;
prevent, in response to detecting the user activation, the dynamic value from being further iteratively displayed beyond the particular adjusted payment amount; and
insert, in response to detecting the user activation, the particular adjusted payment amount in a payment document used by the payor to complete the payment.

13. The system of claim 8,
wherein each of the plurality of payment collection records corresponds one of a plurality of eCommerce transactions between the plurality of payors and the plurality of payees,
wherein at least one of the plurality of payment collection records represents a plurality of eCommerce actions exchanged for at least one of the plurality of eCommerce transactions, and
wherein the plurality of eCommerce actions comprises an invoice, a message associated with the invoice, and a completed payment for the invoice that are exchanged between at least one of the plurality of payors and at least one of the plurality of payees.

14. The system of claim 13, wherein analyzing the plurality of payment collection records comprises:
extracting, from the plurality of payment collection records, at least one attribute selected from a group consisting of a payor attribute of the plurality of payors, a payee attribute of the plurality of payees, and a transaction attribute of the plurality of eCommerce actions; and generating a correlation between a payment promptness measure of the plurality of payment collection records with respect to the at least one attribute, wherein the payment statistical measure is based on the correlation.

15. A non-transitory computer readable medium storing instructions for expediating collection of a payment, the instructions, when executed by a computer processor, comprising functionality for:

sending, to a payor, a request for the payment, wherein the request comprises an original payment amount and an original payment due date;

generating, based on a plurality of payment collection records from an online financial management application (FMA) used by a plurality of payees, a payment statistical measure representing a payment behavior of a plurality of payors paying the plurality of payees;

generating, based on the payment statistical measure, the original payment amount, and the original payment due date, an adjusted payment amount and a condition to qualify the adjusted payment amount for completing the payment;

inserting an actionable dynamic field in a graphical user interface of the FMA;

iteratively generating, according to the condition, a dynamic value of the adjusted payment amount based on a current time;

detecting, at a particular current time, a user activation of the actionable dynamic field when the dynamic value equals a particular adjusted payment amount;

enabling, prior to the payor completing the payment, the payor to view the adjusted payment amount and the condition, wherein the payor completes the payment in response to at least the payor viewing the adjusted payment amount and the condition; and collecting the payment completed by the payor.

16. The non-transitory computer readable medium of claim 15, the instructions, when executed by the computer processor, further comprising functionality for:

generating, based on the payment statistical measure, a payment statistic ranking of the payor with respect to the plurality of payors;

determining a suggested payment action for the payor to advance to an improved payment statistic ranking with respect to the plurality of payors; and enabling, prior to the payor completing the payment, the payor to view the suggested payment action and the improved payment statistic ranking, wherein the condition comprises the suggested payment action and the improved payment statistic ranking.

17. The non-transitory computer readable medium of claim 15, the instructions, when executed by the computer processor, further comprising functionality for:

identifying, in the online FMA, a business target of a payee of the payment, wherein the business target specifies a target business measure to be met prior to a target date; and generating an estimated contribution of the payment to the business target by at least comparing the target business measure and the original payment amount, wherein generating the adjusted payment amount and the condition is further based on the estimated contribution, and wherein the condition requires that the adjusted payment amount to be received prior to at least the target date.

18. The non-transitory computer readable medium of claim 15, the instructions, when executed by the computer processor, further comprising functionality for:

detecting, subsequent to the payor viewing the adjusted payment amount and the condition, that the payor has not submitted the adjusted payment amount based on the condition;

generating, in response to the detecting, a further adjusted payment amount and a further condition to qualify the further adjusted payment amount for completing the payment;

enabling, prior to the payor completing the payment, the payor to view the further adjusted payment amount and the further condition; and receiving, from the payor and in response to the payor viewing the further adjusted payment amount and the further condition, the further adjusted payment amount to complete the payment based on the further condition.

19. The non-transitory computer readable medium of claim 15, the instructions, when executed by the computer processor, further comprising functionality for:

iteratively displaying, as the current time progresses, the dynamic value in the actionable dynamic field to present a real time animation sequence to the payor, wherein the real time animation sequence comprises the adjusted payment amount as a function of the current time according to the condition;

preventing, in response to detecting the user activation, the dynamic value from being further iteratively displayed beyond the particular adjusted payment amount; and inserting, in response to detecting the user activation, the particular adjusted payment amount in a payment document used by the payor to complete the payment.

20. The non-transitory computer readable medium of claim 15, wherein each of the plurality of payment collection records corresponds one of a plurality of eCommerce transactions between the plurality of payors and the plurality of payees, wherein at least one of the plurality of payment collection records represents a plurality of eCommerce actions exchanged for at least one of the plurality of eCommerce transactions, and wherein the plurality of eCommerce actions comprises an invoice, a message associated with the invoice, and a completed payment for the invoice that are exchanged between at least one of the plurality of payors and at least one of the plurality of payees.

* * * * *